(12) United States Patent
Hahakura et al.

(10) Patent No.: US 9,884,422 B2
(45) Date of Patent: Feb. 6, 2018

(54) ROBOT

(71) Applicant: Seiko Epson Corporation, Tokyo (JP)

(72) Inventors: Seiji Hahakura, Azumino (JP); Masato Yokota, Matsumoto (JP)

(73) Assignee: Seiko Epson Corporation (JP)

( * ) Notice: Subject to any disclaimer, the term of this patent is extended or adjusted under 35 U.S.C. 154(b) by 285 days.

(21) Appl. No.: 14/695,419

(22) Filed: Apr. 24, 2015

(65) Prior Publication Data

US 2015/0321345 A1 Nov. 12, 2015

(30) Foreign Application Priority Data

May 7, 2014 (JP) ................................. 2014-095732

(51) Int. Cl.
| | |
|---|---|
| B25J 17/00 | (2006.01) |
| B25J 17/02 | (2006.01) |
| B25J 18/00 | (2006.01) |
| B25J 9/00 | (2006.01) |
| B25J 9/04 | (2006.01) |

(52) U.S. Cl.
CPC ............. B25J 9/0018 (2013.01); B25J 9/042 (2013.01); B25J 9/044 (2013.01); *Y10T 74/20305* (2015.01); *Y10T 74/20317* (2015.01)

(58) Field of Classification Search
CPC ...... B25J 9/0018; B25J 9/0027; B25J 9/0087; B25J 9/009; B25J 9/0096; B25J 9/04; B25J 9/041; B25J 9/042; B25J 9/043; B25J 9/044; B25J 9/1615; Y10S 901/14; Y10S 901/23; Y10S 901/27; Y10S 901/28;

(Continued)

(56) References Cited

U.S. PATENT DOCUMENTS 5,634,377 A * 6/1997 Kimura .................... B25J 9/042
74/490.03
6,068,442 A * 5/2000 Flemmer .................. B25J 9/042
414/744.5

(Continued)

FOREIGN PATENT DOCUMENTS

| | | |
|---|---|---|
| EP | 1552911 A1 | 7/2005 |
| JP | 01-306193 | 12/1989 |

(Continued)

OTHER PUBLICATIONS

Extended European Search Report for Patent Application No. EP15161335.3 dated Apr. 15, 2016 (7 pages).

*Primary Examiner* — Jake Cook
(74) *Attorney, Agent, or Firm* — Harness, Dickey & Pierce, P.L.C.

(57) ABSTRACT

A robot includes a base, a first arm rotatably provided on the base via a first connecting section, a second arm rotatably provided on the first arm via a second connecting section, and a movable shaft section provided in the second arm and movable with respect to the second arm. When a movable range of the movable shaft section is represented as S and the height between a distal end of the movable shaft section on the opposite side of the first arm at the time when the movable shaft section moves to the first arm side most with respect to the second arm and a first connection surface, which is a connection surface of the base and the first connecting section, is represented as $H_1$, a relation $H_1 \leq 3S$ is satisfied.

12 Claims, 3 Drawing Sheets

(58) Field of Classification Search
CPC .............. Y10S 901/29; Y10T 74/20305; Y10T 74/20317; Y10T 74/20329
USPC .............. 74/490.01, 490.02, 490.03, 490.05, 74/490.06; 901/14, 15, 23, 24, 27, 28, 29
See application file for complete search history.

(56) References Cited

U.S. PATENT DOCUMENTS

| | | | | |
|---|---|---|---|---|
| 6,102,649 | A * | 8/2000 | Ogawa | B25J 9/1065 414/744.5 |
| 6,109,860 | A * | 8/2000 | Ogawa | B25J 9/042 414/744.5 |
| 6,293,746 | B1 * | 9/2001 | Ogawa | B25J 9/042 414/744.4 |
| 7,422,412 | B2 * | 9/2008 | Akaha | B25J 9/042 414/744.5 |
| 7,975,568 | B2 * | 7/2011 | Zhang | B25J 9/042 74/490.03 |
| 8,104,372 | B2 * | 1/2012 | Meyerhoff | B25J 9/044 74/490.01 |
| 9,168,660 | B2 * | 10/2015 | Sato | B25J 9/042 |
| 2005/0193854 | A1 * | 9/2005 | Sanemasa | B25J 19/0029 74/490.02 |
| 2008/0016979 | A1 | 1/2008 | Yasumura et al. | |
| 2009/0270192 | A1 * | 10/2009 | Titus | A63D 15/12 473/49 |
| 2012/0285007 | A1 * | 11/2012 | Ono | B23P 21/004 29/771 |
| 2013/0145893 | A1 * | 6/2013 | Kumagai | B25J 9/0018 74/490.05 |
| 2013/0152722 | A1 * | 6/2013 | Kumagai | B25J 9/0018 74/490.01 |
| 2015/0128749 | A1 * | 5/2015 | Gilchrist | H01L 21/67742 74/490.04 |
| 2015/0321344 | A1 * | 11/2015 | Hahakura | B25J 19/04 74/490.02 |
| 2015/0321361 | A1 * | 11/2015 | Hahakura | B25J 18/00 74/490.01 |
| 2016/0221182 | A1 * | 8/2016 | Hahakura | B25J 9/0018 |

FOREIGN PATENT DOCUMENTS

| | | |
|---|---|---|
| JP | 06-141452 | 5/1994 |
| JP | 09-085672 | 3/1997 |
| JP | 2008-023642 A | 2/2008 |
| JP | 2009-220221 A | 10/2009 |
| JP | 2010-238878 A | 10/2010 |
| JP | 2010-247250 A | 11/2010 |
| JP | 2011-000659 A | 1/2011 |
| JP | 2013-099801 A | 5/2013 |
| WO | WO-2012-029173 A1 | 3/2012 |
| WO | WO-2012-029174 A1 | 3/2012 |

* cited by examiner

ROBOT

BACKGROUND

1. Technical Field

The present invention relates to a robot.

2. Related Art

In recent years, automation by industrial robots is ongoing for manufacturing such as automotive body manufacturing. As the industrial robots, industrial robots including robot arms such as a horizontally articulated robot (a SCARA robot) and a vertically articulated robot have been widely used.

In assembly work by such industrial robots, a plurality of robots are set to surround an assembly workbench on a setting surface on which the assembling workbench is set. The plurality of robots perform assembly work for an assembly on the assembly workbench while cooperating with one another.

In the assembly work by the plurality of robots, it is necessary to keep a horizontal state of the robots. As measures for keeping the horizontal state of the robots, the rigidity of a base fixed on the setting surface for the robots is increased. However, the increase in the rigidity of the base causes an increase in costs of the base itself. Further, a rotating range of the robot arms is limited centering on the position of the base.

Therefore, for example, a ceiling hanging SCARA robot hung from a ceiling surface has been developed (see, for example, WO2012/029173 (Patent Literature 1)). Specifically, the ceiling hanging SCARA robot includes a base fixed to the ceiling surface side, a first arm rotatably provided on the base via a first connecting section, a second arm rotatably provided on the first arm via a second connecting section, and a movable shaft section provided in the second arm and movable in the gravity direction.

In such a ceiling hanging SCARA robot, a rotatable range of the first arm and the second arm can be set to 360° or more.

However, in the ceiling hanging SCARA robot in the past, as a stroke amount of the movable shaft section is increased, for example, the connecting section of the first arm and the second arm also increases and vibration tends to occur in the movable shaft section. When the vibration occurs in the movable shaft section, deterioration in working accuracy is caused.

SUMMARY

An advantage of some aspects of the invention is to provide a robot that can suppress vibration that occurs in a movable shaft section.

The invention adopts configurations explained below.

A robot according to an aspect of the invention includes: a first member; a first arm rotatably provided on the first member via a first connecting section; a second arm rotatably provided on the first arm via a second connecting section; and a movable shaft section provided in the second arm and movable with respect to the second arm. When a movable range of the movable shaft section is represented as S and the height between a distal end of the movable shaft section on the opposite side of the first arm at the time when the movable shaft section moves to the first arm side most with respect to the second arm and a first connection surface, which is a connection surface of the first member and the first connecting section, is represented as $H_1$, a relation $H_1 \leq 3S$ is satisfied.

With this configuration, it is possible to suppress vibration that occurs in the movable shaft section.

In the configuration described above, a relation $2S \leq H_1 \leq 3S$ may be satisfied.

In the case of this configuration, it is possible to increase the movable range of the movable shaft section.

In the configuration described above, a relation $2S \leq H_1 \leq 2.7S$ may be satisfied.

In the case of this configuration, it is possible to further increase the movable range of the movable shaft section.

In the configuration described above, a relation $S \geq 150$ mm may be satisfied.

In the case of this configuration, it is possible to increase the movable range of the movable shaft section.

In the configuration described above, when the height between the first connection surface and a second connection surface, which is a connection surface of the first arm and the second connecting section, is represented as $H_2$ and the height between the first connection surface and a third connection surface, which is a connection surface of the first arm and the first connecting section, is represented as $H_3$, relations of $H_1 \geq 3.5H_2$, $H_2-H_3 \leq H_3 \leq 1.2(H_2-H_3)$, and $H_2-H_3 \leq 80$ mm may be satisfied.

In the case of this configuration, it is possible to suppress vibration that occurs in the movable shaft section.

In the configuration described above, a relation 55 mm $\leq H_2-H_3 \leq 65$ mm may be satisfied.

In the case of this configuration, it is possible to further suppress vibration that occurs in the movable shaft section.

In the configuration described above, the first connecting section may include a first coupling section and a first reinforcing section having rigidity higher than the rigidity of the first coupling section.

In the case of this configuration, it is possible to suppress vibration that occurs in the movable shaft section.

In the configuration described above, the second connecting section may include a second coupling section and a second reinforcing section having rigidity higher than the rigidity of the second coupling section.

In the case of this configuration, it is possible to suppress vibration that occurs in the movable shaft section.

In the configuration described above, the shaft diameter of the movable shaft section may be equal to or larger than 20 mm.

In the case of this configuration, it is possible to suppress vibration that occurs in the movable shaft section.

In the configuration described above, the robot may further include a driving section configured to turn the second arm. The driving section may include: a hollow reduction gear provided in the second connecting section; a motor provided in the first arm; and a pulley provided in the first arm and configured to transmit a driving force of the motor to the hollow reduction gear. The driving section may include a wire in a hollow pipe provided in the center portion of the hollow reduction gear.

In the case of this configuration, it is possible to turn the second connecting section with the driving section while suppressing the thickness of the first arm from increasing.

In the configuration described above, the hollow pipe may be fixed to the first arm via a ring-like positioning member.

In the case of this configuration, the hollow pipe is fixed to the first arm by the positioning member. It is possible to prevent, with the positioning member, the wire present on the inner side of the hollow pipe from being rubbed by contact with the hollow pipe.

In the configuration described above, a partition plate located between the pulley and the wire may be provided on the inside of the first arm.

In the case of this configuration, it is possible to prevent interference of the pulley and the wire.

In the configuration described above, a hole section and a lid section for covering the hole section may be provided in the first arm.

In the case of this configuration, it is possible to perform, through the hole section, maintenance of the pulley and the like provided on the inside of the first arm.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
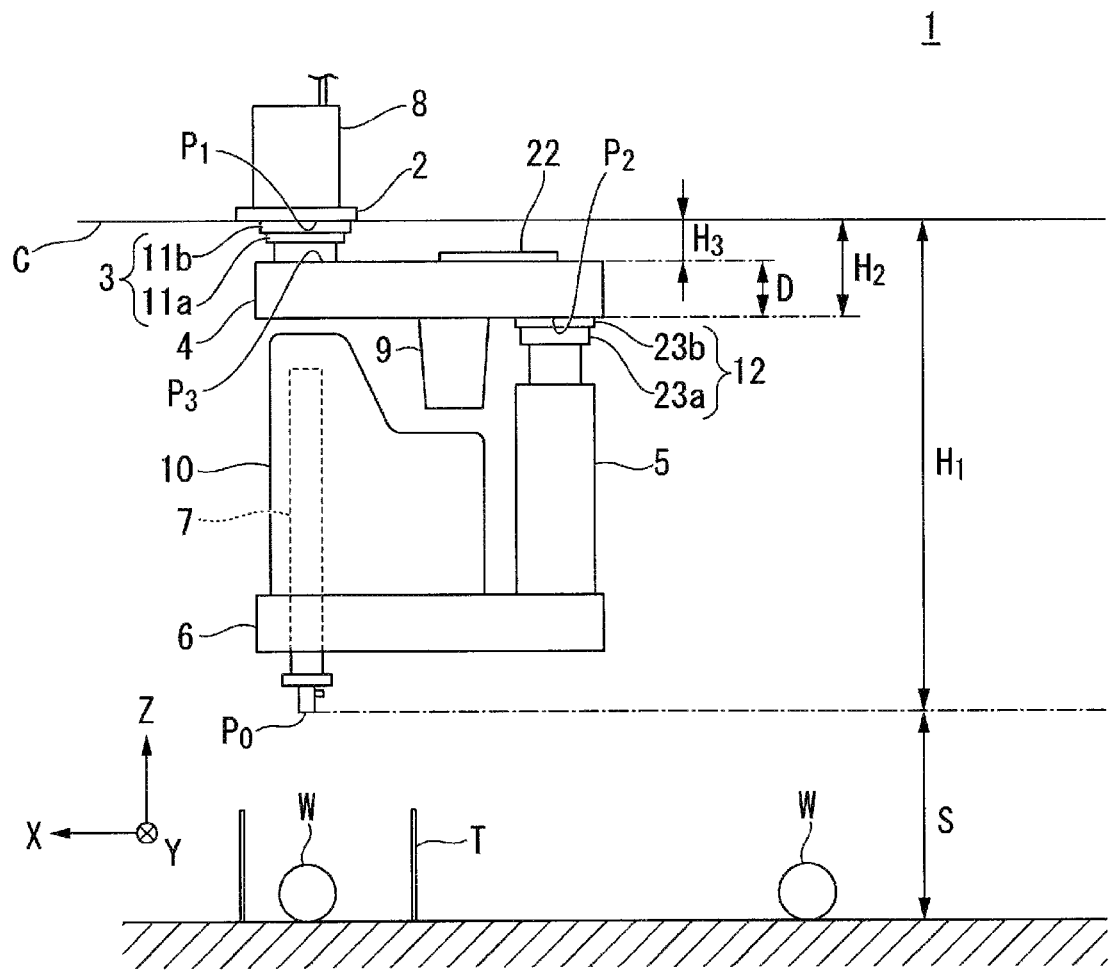
FIG. 1 is a side view showing the schematic configuration of a ceiling hanging SCARA robot according to an embodiment of the invention.

An embodiment of the invention is explained in detail below with reference to the drawings.

Note that the invention is not limited to the embodiment explained below and can be changed and carried out as appropriate without departing from the spirit of the invention. In the drawings referred to in the following explanation, in order to clearly show components, the components are sometimes schematically shown. Some components are shown with scales of dimensions thereof varied.

First, as an embodiment of the invention, for example, a ceiling hanging SCARA robot 1 shown in FIG. 1 is explained. Note that FIG. 1 is a side view showing the schematic configuration of the ceiling hanging SCARA robot 1. In the following explanation, an XYZ rectangular coordinate system is set. Positional relations among members are explained with reference to the XYZ rectangular coordinate system. Specifically, the left-right direction of the paper surface in FIG. 1 is represented as an X-axis direction, a direction orthogonal to the paper surface in FIG. 1 is represented as a Y-axis direction, and the up-down direction of the paper surface in FIG. 1 is represented as a Z-axis direction. The Z-axis direction coincides with the gravity direction.

The ceiling hanging SCARA robot 1 includes, as shown in FIG. 1, a base 2 fixed to a ceiling surface C side, a first arm 4 provided rotatably in the horizontal direction on the base 2 via a first connecting section 3, a second arm 6 provided rotatably in the horizontal direction on the first arm 4 via a second connecting section 5, and a movable shaft section 7 provided in the second arm 6 and movable in the gravity direction.

The first connecting section 3 supports the first arm 4 present below the base 2 rotatably in the axial direction of the Z axis with respect to the base 2. The first arm 4 is extended from the first connecting section 3 in the horizontal direction. The second connecting section 5 supports the second arm 6 present below the first arm 4 rotatably in the axial direction of the Z axis with respect to the first arm 4. The second connecting section 5 has length corresponding to a movable range (hereinafter referred to as stroke amount) in the gravity direction of the movable shaft section 7 between the first arm 4 and the second arm 6 in order to prevent contact with the first arm 4 when the movable shaft section 7 is present in a top position. The second arm 6 is extended from the second connecting section 5 in the horizontal direction.

The movable shaft section 7 is provided on the distal end side of the second arm 6. The movable shaft section 7 is supported movably in the gravity direction (the Z-axis direction) and supported rotatably in the axial direction of the Z axis. End effectors (effectors) adapted to various kinds of work such as a robot hand, an actuator, a light, a camera, a sensor, and a control section are replaceably attached to the distal end of the movable shaft section 7. Note that, in an example explained in this embodiment, work for taking out work W housed in a tray T on a workbench to the outside of the tray T with a robot hand (not shown in the figure) attached to the distal end of the movable shaft section 7 is performed. The movable shaft section 7 only has to be at least moved up and down in the gravity direction. Further, the movable shaft section 7 can also be rotatably provided in the second arm 6 via a third connecting section (not shown in the figure).

Rotatable ranges of the first connecting section 3 and the second connecting section 5 are respectively ranges of angles equal to or larger than 360°. The distance between the rotating center of the first connecting section 3 and the rotating center of the second connecting section 5 and the distance between the rotating center of the second connecting section 5 and the axis of the movable shaft section 7 are set the same. Consequently, when the first arm 4 and the second arm 6 are present in positions overlapping in plan view, the rotating center of the first connecting section 3 and the axis of the movable shaft section 7 are located on the same axis.

The ceiling hanging SCARA root 1 includes a first driving section 8 that rotates the first connecting section 3, a second driving section 9 that rotates the second connecting section 5, and a third driving section 10 that moves and rotates the movable shaft section 7. The first driving section 8 is provided on the upper surface side of the base 2. The second driving section 9 is provided on the lower surface side of the first arm 4. The third driving section 10 is provided on the upper surface side of the second arm 6.

In the ceiling hanging SCARA robot 1 having the configuration explained above, the first arm 4 rotates in the horizontal direction with respect to the base 2, the second arm 6 rotates in the horizontal direction with respect to the first arm 4, and the movable shaft section 7 moves in the gravity direction with respect to the second arm 6. Consequently, it is possible to cause the ceiling hanging SCARA robot 1 to perform work for taking out the work W housed in the tray T to the outside of the tray T.

In the ceiling hanging SCARA robot 1 in this embodiment, when the movable range (the stroke amount) in the gravity direction of the movable shaft section 7 is represented as S and the height between a distal end $P_0$ on the gravity direction lower side of the movable shaft section 7 at the time when the movable shaft section 7 moves to the gravity direction upper side most with respect to the second arm 6 and a first connection surface $P_1$, which is a connection surface of the base 2 and the first connecting section 3, is represented as $H_1$, a relation of the following Expression (1) is satisfied.

$$H_1 \leq 3S \tag{1}$$

When it is desired to increase the stroke amount S of the movable shaft section 7, it is necessary to secure a distance in the height direction corresponding to the stroke amount S of the movable shaft section 7 between the first arm 4 and the second arm 6. In this case, as the distance between the first arm 4 and the second arm 6 is longer, the length of the second connecting section 5 is larger. The second connecting section 5 is a portion that rotatably connects the second arm 6 to the first arm 4. When the rigidity of this portion is low, vibration tends to occur in the movable shaft section 7 provided on the distal end side of the second arm 6. On the other hand, when the rigidity of the second connecting section 5 is increased, a bend tends to occur in the first arm 4 because of an increase in the weight of the second connecting section 5. Therefore, in this case as well, vibration tends to occur in the movable shaft section 7.

Therefore, in the ceiling hanging SCARA robot 1 in this embodiment, by satisfying the relation of the above Expression (1), it is possible to increase the stroke amount S of the movable shaft section 7 while suppressing vibration that occurs in the movable shaft section 7. Specifically, it is possible to increase the stroke amount S of the movable shaft section 7 to 150 mm or more (S≥150 mm).

Further, in the ceiling hanging SCARA robot 1 in this embodiment, it is preferable to satisfy a relation of the following Expression (1)' and more preferable to satisfy a relation of the following Expression (1)''. Consequently, it is possible to further increase the stroke amount S of the movable shaft section 7.

$$2S \leq H_1 \leq 3S \tag{1'}$$

$$2S \leq H_1 \leq 2.7S \tag{1''}$$

In the ceiling hanging SCARA robot 1 in this embodiment, in the configuration in which the above Expression (1) is satisfied, when the height between the first connection surface $P_1$ and a second connection surface $P_2$, which is a connection surface of the first arm 4 and the second connecting section 5, is represented as $H_2$ and the height between the first connection surface $P_1$ and a third connection surface $P_3$, which is a connection surface of the first arm 4 and the first connecting section 3, is represented as $H_3$, relations of the following Expressions (2), (3), and (4) are satisfied.

$$H_1 \geq 3.5 H_2 \tag{2}$$

$$H_2 - H_3 \leq H_3 \leq 1.2(H_2 - H_3) \tag{3}$$

$$H_2 - H_3 \leq 80 \text{ mm} \tag{4}$$

In order to satisfy the relation of the above Expression (1), it is necessary to keep the height $H_2$ from the ceiling surface C to the lower surface of the first arm 4 small. In this case, by satisfying the relations of the above Expressions (2), (3), and (4), that is, keeping the height (mainly the length of the first connecting section 3) $H_3$ from the ceiling surface C to the upper surface of the first arm 4 and thickness D (=$H_2$−$H_3$) of the first arm 4 small, it is possible to satisfy the relation of the above Expression (1). Specifically, it is possible to set the thickness D of the first arm 4 in a range of 50 mm to 60 mm (55 mm≤$H_2$−$H_3$≤65 mm).

In order to satisfy the relations of the above Expressions (2), (3), and (4), it is necessary to increase the rigidity of a portion extending from the base 2 to the first arm 4 via the first connecting section 3 while suppressing the height of the portion.

Specifically, in the ceiling hanging SCARA robot 1 in this embodiment, the first connecting section 3 includes a first coupling section 11a and a first reinforcing section 11b. The first coupling section 11a is a portion coupled to the base 2. The first reinforcing section 11b is made of a ring-like plate having rigidity higher than the rigidity of the first coupling section 11a and having an outer diameter larger than the outer diameter of the first coupling section 11a. In the ceiling hanging SCARA robot 1, by providing such a first reinforcing section 11b between the base 2 and the first coupling section 11a, it is possible to increase the rigidity of this portion while suppressing an increase in a dimension in the height direction. Note that, in this embodiment, a steel material is used as the first reinforcing section 11b. An aluminum material is used as the first coupling section 11a.

Figure 2:
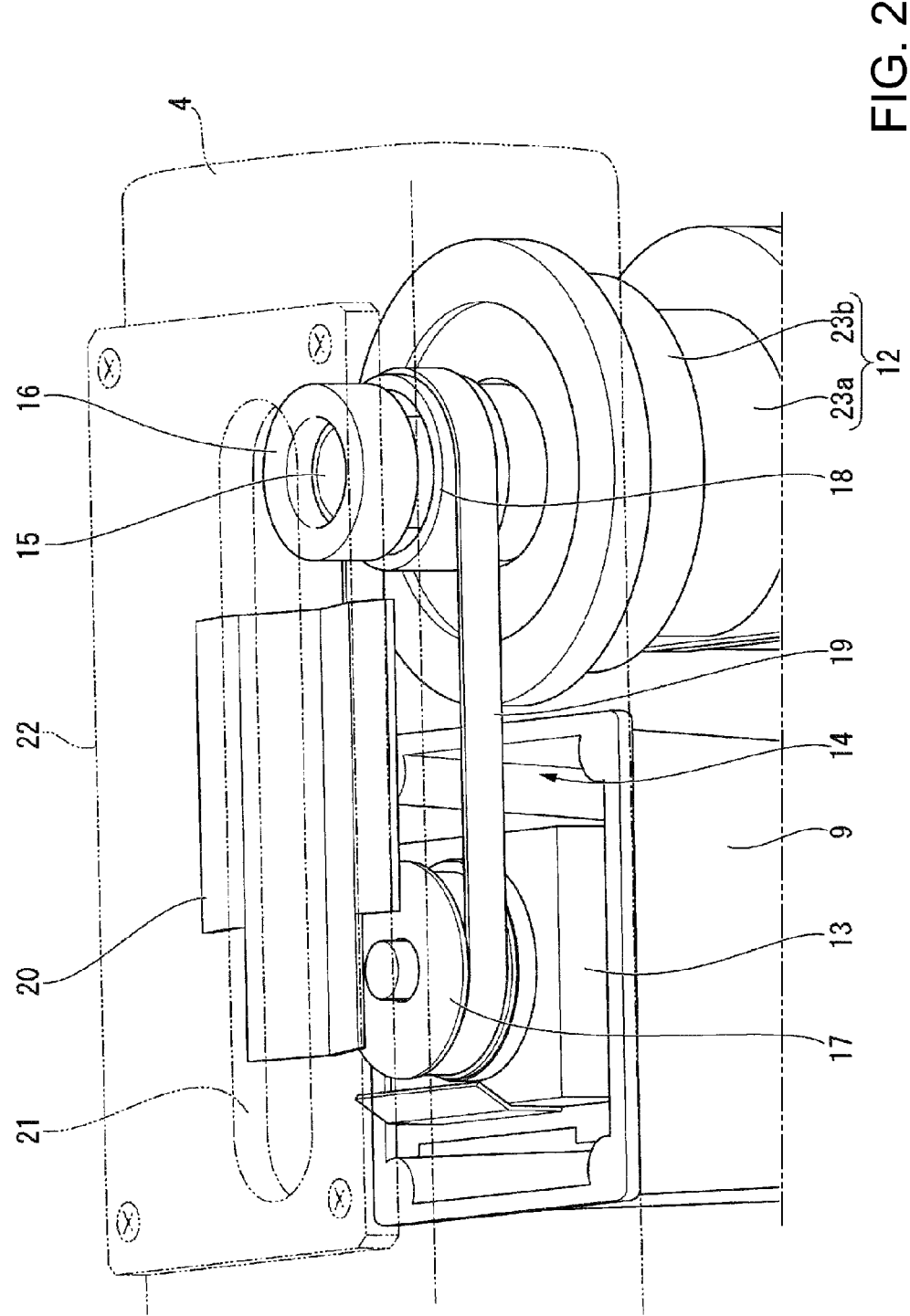
FIG. 2 is a perspective view for explaining the configuration of a second driving section of the ceiling hanging SCARA robot shown in FIG. 1.

In the second driving section 9, as shown in FIGS. 1 and 2, the thickness D of the first arm 4 is kept small. Note that FIG. 2 is a perspective view for explaining the configuration of the second driving section 9.

Specifically, the second driving section 9 includes a hollow reduction gear 12, a motor 13 provided on the lower surface side of the first arm 4, and a pulley 14 provided on the inside of the first arm 4.

The hollow reduction gear 12 reduces a driving force transmitted from the motor 13. A hollow pipe 15 is provided in the center portion of the hollow reduction gear 12. In the ceiling hanging SCARA robot 1, a wire and the like (not shown in the figure) are drawn around between the first arm 4 and the second arm 6 through the hollow pipe 15. The hollow pipe 15 is positioned and fixed to the first arm 4 side via a ring-like positioning member 16. Consequently, the hollow pipe 15 is fixed to the first arm 4 by the positioning member 16. The positioning member 16 can prevent the wire present on the inner side of the hollow pipe 15 from being rubbed by contact with the hollow pipe 15.

The pulley 14 transmits the driving force from the motor 13 to the hollow reduction gear 12. In the pulley 14, an endless belt 19 is laid over between a driving pulley 17 on the motor 13 side and a driven pulley 18 on the hollow reduction gear 12 side. On the inner side of the first arm 4, a partition plate 20 is provided between the pulley 14 and the wire in order to prevent interference of the pulley 14 and the wire. Further, a hole section 21 and a lid section 22 for closing the hole section 21 are provided on the upper surface of the first arm 4. In the ceiling hanging SCARA robot 1, it is possible to perform, through the hole section 21, maintenance of the pulley 14 and the like provided on the inside of the first arm 4.

Figure 3:
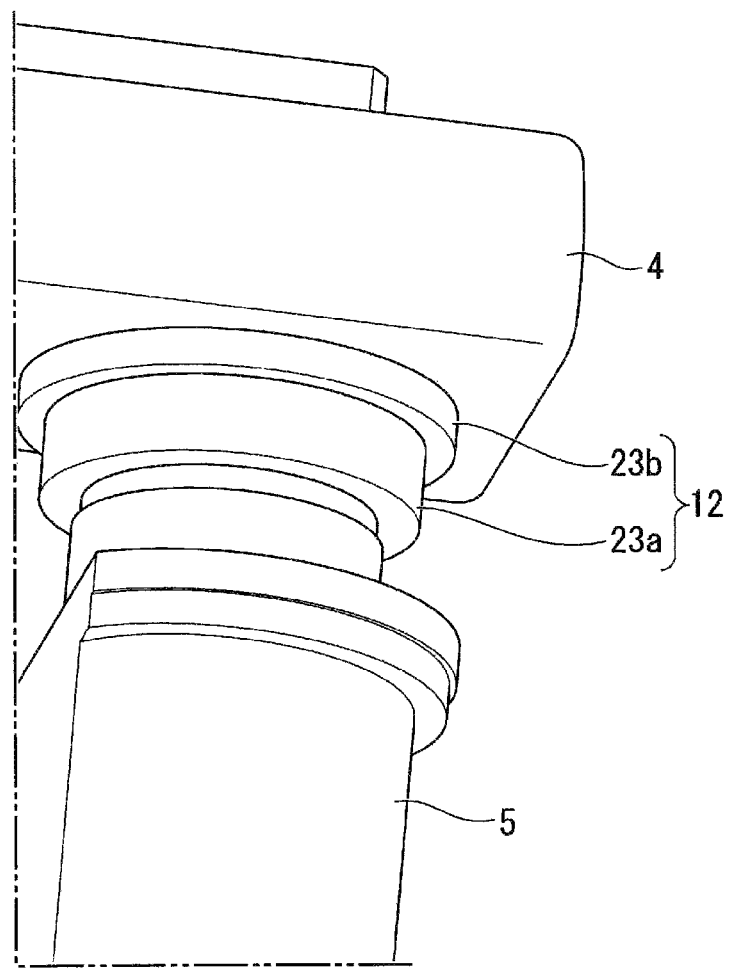
FIG. 3 is a perspective view for explaining the configuration of a second connecting section of the ceiling hanging SCARA robot.

The second connecting section 5 includes, as shown in FIGS. 1 and 3, a second coupling section 23a and a second reinforcing section 23b. Note that FIG. 3 is a perspective view for explaining the configuration of the second connecting section 5. The second coupling section 23a is a portion coupled to the first arm 4. The second reinforcing section 23b is made of a ring-like plate having rigidity higher than the rigidity of the second coupling section 23a and having an outer diameter larger than the outer diameter of the second coupling section 23a. In the ceiling hanging SCARA robot 1, by providing such a second reinforcing section 23b between the first arm 4 and the second coupling section 23a, it is possible to increase the rigidity of this portion while suppressing an increase in a dimension in the height direction. Note that, in this embodiment, a steel material is used as the second reinforcing section 23b. An aluminum material is used as the second coupling section 23a.

In the ceiling hanging SCARA robot 1 in this embodiment, by including the structure explained above, it is possible to set the shaft diameter of the movable shaft section 7 larger than in the past. Specifically, the shaft diameter of the movable shaft section 7 can be set to 20 mm or more. Consequently, it is possible to suppress vibration that occurs in the movable shaft section 7. On the other hand, the shaft diameter of the movable shaft section 7 is preferably set to 40 mm or less.

As explained above, in the ceiling hanging SCARA robot 1 in this embodiment, by including the configuration explained above, it is possible to increase the stroke amount S of the movable shaft section 7 while suppressing vibration that occurs in the movable shaft section 7.

Note that the invention is not limited to the embodiment. Various changes may be made to the embodiment without departing from the spirit of the invention.

For example, in the example explained in the embodiment, the work for taking out the work W housed in the tray T to the outside of the tray T is performed using the ceiling hanging SCARA robot 1. However, it is possible to perform not only such work but also various kinds of works using the ceiling hanging SCARA robot 1. Further, it is also possible to configure a robot system by combining a plurality of the ceiling hanging SCARA robot 1.

The invention is not limited to a SCARA robot used while being hung from the ceiling surface C like the ceiling hanging SCARA robot 1. In some case, the invention can be a SCARA robot in which the base 2 is fixed on the setting surface side on which the workbench is set (a form in which the ceiling hanging SCARA robot 1 is used in an overrotated state) and a SCARA robot in which the base is fixed on a side surface perpendicular to the setting surface on which the workbench is set (a form in which the ceiling hanging SCARA robot 1 is used in a lateral state).

The present is not always limited to the structure of the SCARA robot explained above. It is possible to adopt various robot structures. For example, it is also possible to further increase the number of arms by adopting a movable first member (a movable member) like an arm instead of the first member (a fixed member) fixed to a fixing surface such as the ground, a table, a wall, or a ceiling like the base 2.

The entire disclosure of Japanese Patent Application No. 2014-095732, filed May 7, 2014 is expressly incorporated by reference herein.

What is claimed is:

1. A robot comprising:
a first member that is provided above a ceiling;
a first arm rotatably provided on the first member via a first connecting section and that is provided below the ceiling;
a second arm rotatably provided on the first arm via a second connecting section, the second arm rotating with respect to a rotation axis; and
a movable shaft section that extends in a shaft direction, that is provided in the second arm and that is movable with respect to the second arm along the shaft direction parallel to the rotation axis, a tip of the movable shaft section facing opposite to the ceiling, wherein
the movable shaft section has first and second states:
in the first state, the movable shaft section is housed in the second arm so that the movable shaft section is located an uppermost position of a movable range of the movable shaft section, and the tip of the movable shaft section is located directly adjacent to a bottom of the second arm; and
in the second state, the movable shaft section is vertically downwardly shifted from the uppermost position to a lowermost position of the movable range of the movable shaft section so that the movable shaft section is movable between the uppermost position and the lowermost position,
the movable range of the movable shaft section is represented as S,
a first shortest distance between the ceiling and the tip of the movable shaft section in the first state is represented as $H_1$, and
a relation $2S \leq H_1 \leq 3S$ is satisfied.

2. The robot according to claim 1, wherein a relation $2S \leq H_1 \leq 2.7S$ is satisfied.

3. The robot according to claim 1, wherein a relation $S \geq 150$ mm is satisfied.

4. The robot according to claim 1, wherein
a second shortest distance between the ceiling and a bottom of the first arm is represented as $H_2$,
a third shortest distance between the ceiling and a top of the first arm is represented as $H_3$, and
relations of $H_1 \geq 3.5H_2$, $H_2-H_3 \leq H_3 \leq 1.2(H_2-H_3)$, and $H_2-H_3 \leq 80$ mm are satisfied.

5. The robot according to claim 4, wherein a relation $55$ mm $\leq H_2-H_3 \leq 65$ mm is satisfied.

6. The robot according to claim 1, wherein the first connecting section includes a first coupling section and a first reinforcing section having rigidity higher than rigidity of the first coupling section.

7. The robot according to claim 1, wherein the second connecting section includes a second coupling section and a second reinforcing section having rigidity higher than rigidity of the second coupling section.

8. The robot according to claim 1, wherein a shaft diameter of the movable shaft section is equal to or larger than 20 mm.

9. The robot according to claim 1, further comprising a driving section that rotates the second arm, wherein
the driving section includes:
a hollow reduction gear provided in the second connecting section;
a motor provided in the first arm; and
a pulley provided in the first arm and configured to transmit a driving force of the motor to the hollow reduction gear.

10. The robot according to claim 9,
wherein the driving section includes a hollow pipe provided in a center portion of the hollow reduction gear, and
the hollow pipe is fixed to the first arm via a ring-like positioning member.

11. The robot according to claim 9,
wherein a partition plate located adjacent to the pulley is provided in an inside of the first arm.

12. The robot according to claim 1, wherein a hole section and a lid section for covering the hole section are provided in the first arm.

* * * * *